(12) United States Patent
Neuenschwander

(10) Patent No.: US 6,237,214 B1
(45) Date of Patent: *May 29, 2001

(54) APPARATUS FOR MANUFACTURING LAMINATED PARTS WITH CENTER INTERLOCK

(75) Inventor: Thomas R. Neuenschwander, Fort Wayne, IN (US)

(73) Assignee: L. H. Carbide Corporation, Fort Wayne, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,146

(22) Filed: Aug. 5, 1998

Related U.S. Application Data

(62) Division of application No. 07/966,876, filed on Oct. 26, 1992, now Pat. No. 5,809,638.

(51) Int. Cl.$^7$ ...................................................... H02K 15/02
(52) U.S. Cl. ............................ 29/598; 29/564.2; 29/609; 29/596
(58) Field of Search ............................. 29/609, 596, 738, 29/732, 564.2, 598; 310/216, 217; 428/137

(56) References Cited

U.S. PATENT DOCUMENTS

| | | | |
|---|---|---|---|
| 2,671,951 | 3/1954 | Sliwiak | 29/155.61 |
| 2,975,312 | 3/1961 | Ploran | 310/217 |
| 3,202,851 | 8/1965 | Zimmerle | 310/259 |
| 3,203,077 | 8/1965 | Zimmerle | 29/155.5 |
| 3,958,325 | * 5/1976 | Rick et al. | 29/596 |
| 4,110,895 | 9/1978 | Mitsui | 29/564 |
| 4,160,182 | 7/1979 | Mitsui | 310/214 |
| 4,162,734 | 7/1979 | Dangelmaier | 414/27 |
| 4,264,663 | 4/1981 | Beenken | 428/133 |
| 4,364,169 | 12/1982 | Kawano | 29/596 |
| 4,538,345 | 9/1985 | Diederichs | 29/596 |
| 4,578,853 | * 4/1986 | Wurth | 29/598 |
| 4,728,842 | 3/1988 | Martin | 310/217 |
| 4,738,020 | 4/1988 | Neuenschwander | 29/598 |
| 4,897,916 | 2/1990 | Blackburn | 29/609 |
| 4,940,913 | * 7/1990 | Fritzsche | 310/216 |
| 4,951,377 | * 8/1990 | Fritzsche | 29/596 |
| 5,075,150 | 12/1991 | Webb | 428/162 |

FOREIGN PATENT DOCUMENTS

| | | | |
|---|---|---|---|
| 2206453A | 1/1989 | (GB) . | |
| 66557 | 4/1983 | (JP) | 29/609 |

* cited by examiner

*Primary Examiner*—Lee Young
*Assistant Examiner*—Minh Trinh
(74) *Attorney, Agent, or Firm*—Baker & Daniels

(57) ABSTRACT

Progressive die assembly for forming a centrally interlocked stack of laminations for rotors, the stack of laminations having a central stack axis. The die assembly includes a punch which forms a centrally located, circular indentation in each lamination, the indentations each having a cental axis which is substantially coaxial with the stack axis. The indentation provides corresponding projections and depressions in the laminas which may be interlocked by engaging adjacent depressions and projections. The station of the die assembly which includes the punch for forming the indentation may also include a counterforce which is applied when punching the indentation so that the stock material is relatively flat. The die assembly also includes a rotating and stacking station in which the laminations are blanked, then rotated, and finally stacked together to form a lamination stack.

8 Claims, 3 Drawing Sheets

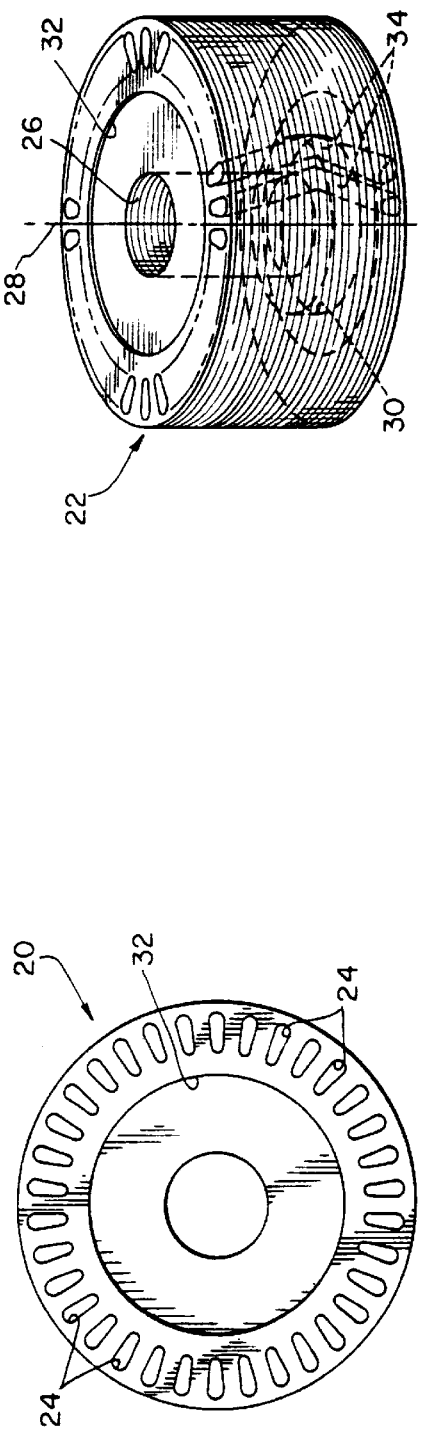
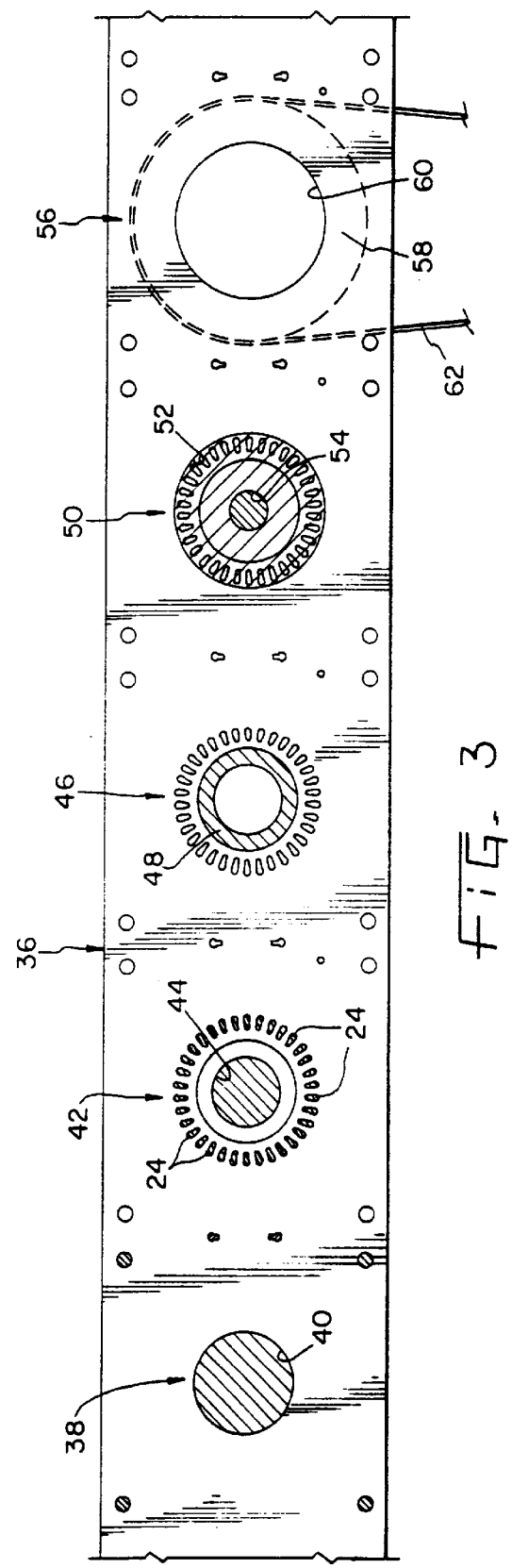

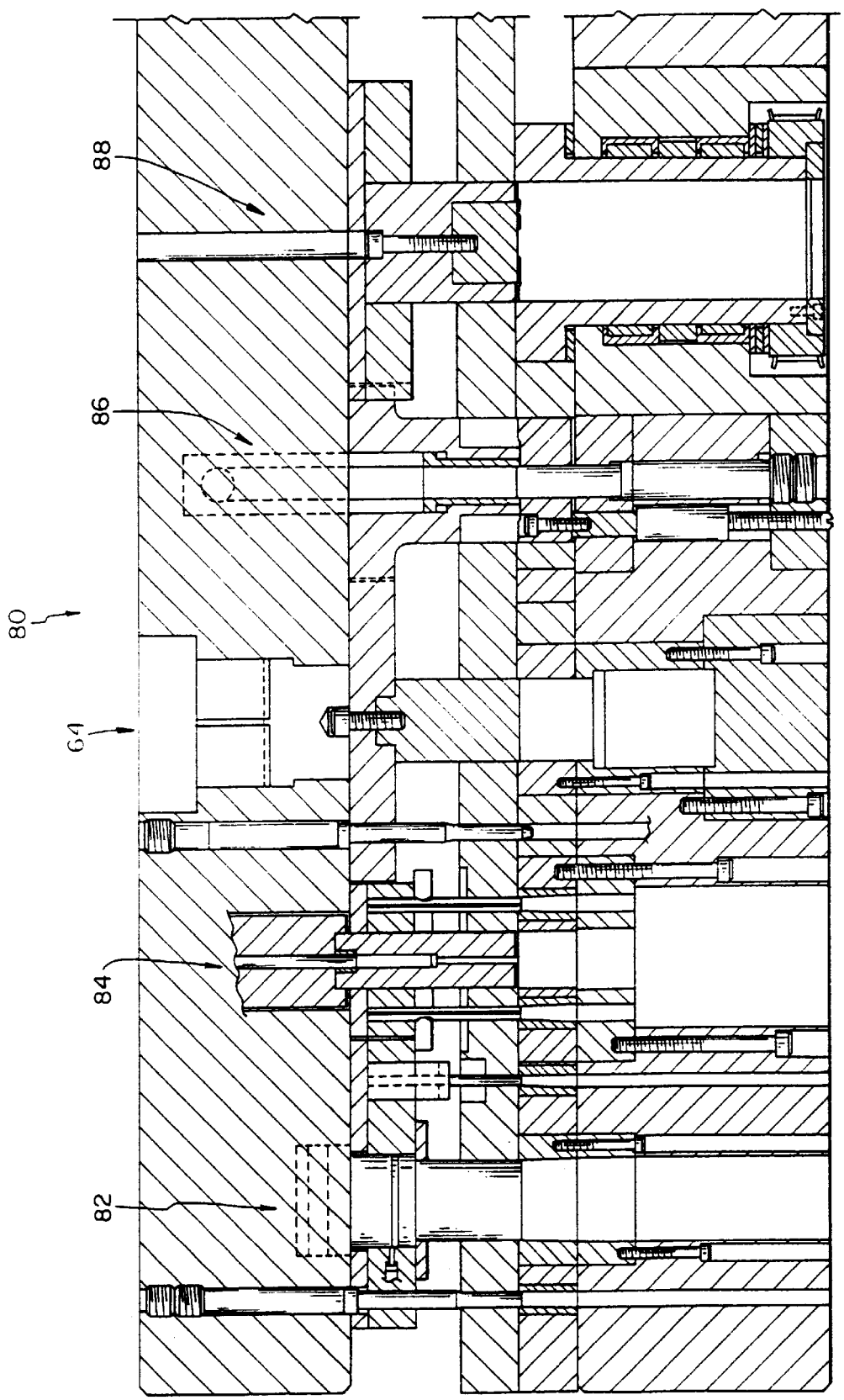

APPARATUS FOR MANUFACTURING LAMINATED PARTS WITH CENTER INTERLOCK

CROSS REFERENCE TO RELATED APPLICATIONS

This is a division of U.S. patent application Ser. No. 07/966,876, filed on Oct. 26, 1992, now U.S. Pat. No. 5,809,638, issued on Sep. 22, 1998. This is a continued prosecution of application Ser. No. 09/129,146, filed Aug. 5, 1998, which is a divisional of application Ser. No. 07/966,876, filed Oct. 26, 1992, now U.S. Pat. No. 5, 809,638.

BACKGROUND OF THE INVENTION

1. Field of the Invention

The present invention relates generally to techniques for forming laminations for magnetic cores such as the magnetic cores (rotors and stators) typically found in dynamoelectric machines. More particularly, the field of the invention is that of centrally interlocked lamination stacks used to manufacture magnetic cores and methods and machines (progressive dies) for processing the material (coil stock) which forms the laminations for such magnetic cores.

2. Description of the Related Art

Typically, the laminas are blanked from continuous strip stock and then stacked and bound together to form the rotor or stator. Progressive die assemblies for producing stator or rotor laminations are well known, wherein a strip of lamination material is fed through a sequence of punching steps to progressively form the laminas to the desired end configuration. It is also well known to form arcuately spaced interlock tabs in the laminas which extend below the lamina lower surface and engage a slot formed in the next lower lamina. In this manner, a plurality of laminas may be formed from a single strip stock and interconnected by means of the interlock tabs.

A lamina stack may be held together by an interlocking structure. Each lamina, excepting the bottom lamina of the stack, may have a plurality of arcuately spaced interlock tabs (typically 4 or 6 circumferentially disposed) depressed from the lamina lower surface adjacent to apertures formed in the lamina below. Each interlock tab engages a corresponding aperture in the next lower lamina of the stack, preferably by the entire thickness of the tab and the aperture in the adjacent lamina. The bottom lamina of the stack may have the interlock tabs blanked and removed to avoid interlocking of the lowermost lamina with an adjacent lamina which forms the top lamina of the prior stack.

Stator stacks include openings around the inner periphery of the stack which are shaped to receive the stator windings, with the openings extending longitudinally straight down the bound stator stack. The laminas of the rotor, however, include a plurality of skewed conductor slots which are formed around the periphery of the rotor stack in arcuately spaced relation to one another, by rotationally indexing the laminas with respect to the rotor stack. Indexing involves rotating the rotor stack with respect to the last produced lamina by a predetermined rotational increment so that, when the laminas are combined in a stack, the space defined by adjacent conductor slots are skewed or slanted relative to the stack axis. Skew inaccuracies and/or excessive adjustment time results from many prior art systems.

One system of forming a stack involves loosely stacking the laminas in a barrel as they are formed and blanked from the stock material in a progressive die assembly. After all the laminas are put into the barrel, the barrel is shuttled to a pressing station and the laminas are pressed together to engage the interlock tabs and thereby form the lamina stack. However, this system does not consistently lock adjacent laminas together because of the loose stacking, the shuttling mechanism is slow and thereby slows production times, and the system lacks a mechanism for creating a desired skew angle for the conductor slots.

Also, variations in the thickness of the stock material of the laminas may cause unbalanced stacks to be formed. In order to compensate for these problems, a system for compensating for the nonuniform stock thickness was developed which rotates the stacked laminas to compensate for variations in thickness while still properly skewing the conductor slots, as described in U.S. Pat. Nos. 4,619,028; 4,738,020; 5,087,849 and 5,123,155, all assigned to the assignee of the present invention and which disclosures are incorporated herein by reference. In the system disclosed in the aforementioned patents, the barrel holding the lamination stack is automatically rotated before each lamina is blanked from the strip stock and interlocks its circumferentially disposed tabs with the lamination stack.

In the apparatus and method disclosed in the aforementioned patents, the individual laminas are rotated by an angle of 180°. Although the laminas may be rotated by other angles, the angle must be at least 360°/(number of interlock tabs) so that the interlocking tabs and slots are properly aligned. The time needed to perform the rotation of the laminas may increase total manufacturing time, and thus increase the cost.

Certain particular structures require great care and expense to manufacture. For example, rotors having conductor slots with a herringbone skew cannot easily be manufactured using conventional interlock techniques. The herringbone skew requires that the first half of the laminas be rotated in one radial direction and that the last half of the laminas be rotated in the other radial direction. The interlocking tabs for each half of the laminas would require an opposite orientation, and would require an additional processing station in a progressive die assembly. The additional processing station entails further expense and complication. Also, rotors having straight (zero skew) conductor slots are difficult to form with interlocking tabs because the interlocking tabs inherently skew the laminas because of the shape of the tab and the aperture in the adjacent lamina which receives it.

Another type of rotor or stator structure which requires great care and expense to manufacture involves applications requiring cores with smaller diameters. For example, a rotor lamina about an inch in diameter includes very little surface area in which to form interlocking tabs.

What is needed is an improved method and apparatus for manufacturing and interlocking laminations.

Also needed is a method and apparatus for manufacturing and interlocking laminations more quickly than known in the prior art.

A further need exists for a method and apparatus for manufacturing laminations that provides an interlock for relatively small lamina stacks.

SUMMARY OF THE INVENTION

The present invention is a lamina stack and the related method and apparatus for manufacturing such lamina stacks which involve forming a centrally located circular projection and depression in individual laminations and interlocking each projection with its adjacent depression. The projection and depression in each lamina is formed by a die punch in the center of the lamina so that the adjacent laminas may be rotated by any angle prior to interlocking.

A solution to many of the aforementioned problems involved in the manufacture of laminations is found in the lamina structure having interlocking projections and depressions. The present invention includes an apparatus and method for manufacturing lamination stacks which have a circular depression interfitting with a mating circular projection of an adjacent lamination. This structure allows for variation in the skew angle which may accommodate herringbone shaped or straight conductor slots. Further, lamination stacks having a relatively small diameter may be conveniently connected by suitably forming projections and depressions in each lamina. The present invention thus provides a reliable machine and method for manufacturing depressions and projections in laminations which may then be interlocked to form a lamination stack for electromagnetic cores.

The die punch is operated in conjunction with a counterforce which flattens the portion of the lamina which forms the projection and depression. In order to reliably connect each adjacent lamina in a stack, each projection should extend as far as possible within the adjacent depression. However, lamina material having a non-planar surface may interfere with the projection fully extending into the depression and thus reduce the amount of engaged surface area, unlike tabs which may extend and engage the adjacent lamina over substantially all of the cross-section of the lamina. Therefore, flattening the projection surface allows for maximum utilization of the engaged surfaces.

The progressive die assembly employing the present invention also increases the speed of manufacture when used in a process which compensates for variations in the thickness of the strip stock material. In the process disclosed in the aforementioned U.S. Patents, the processing step of rotating the laminas consumes a significant portion of time. This additional time is required to physically rotate the stack by 90° or 180° to correctly orient the tabs. At the minimum, the stack must be rotated by 360°/(number of tabs). With the apparatus and method of the present invention, the stack may be rotated by much smaller increments, namely the angular distance between conductor bar slots, and still achieve the desired compensation for variations in thickness. Smaller increments of rotation allow for thickness variations to be more evenly distributed about the center and the resulting cores may be better balanced. Also, by minimizing the amount of rotation, the time needed to manufacture a stack of laminas may be reduced. Further, the amount of rotation may be easily changed by user inputs to the controller which are implemented in software rather than requiring retooling as in prior art structures.

The present invention, in one form thereof, is a method of manufacturing an interlocked lamination stack from a sheet of stock material. Each lamination has a plurality of circumferentially spaced openings, with the openings of the stack of interlocking laminations defining a plurality of circumferentially spaced slots which are disposed at a desired skew angle relative to the axis of the interlocked lamination stack. The lamination stack is adapted for manufacturing a rotor for an dynamoelectric machine. The method comprises the steps of forming laminations with indentations and stacking the laminations. Specifically, a first lamination is formed in the stock material by forming the openings and a centrally located, generally circular indentation, with the indentation defining a corresponding depression and projection. Then the first lamination is blanked from the stock material and stacked with a second lamination, the second lamination also having a centrally located, generally circular indentation. The first lamination is automatically rotated relative to the second lamination by an angle sufficient to define a slot in the resulting stack of laminations having the desired skew angle. Also, the indentations of adjacent laminations are interlocked after rotating the first lamination relative to the second lamination so that a projection of one of the laminations extends into the depression of the other lamination to form the desired stack of to interlocked laminations.

Further, the invention also relates to an apparatus for performing the above mentioned methods, as well as the products produced by the above mentioned methods which is adapted for use in making an dynamoelectric motor.

One object of the present invention is to provide an improved method and apparatus for manufacturing and interlocking laminations.

Also an object is to provide a method and apparatus for manufacturing and interlocking laminations more quickly than known in the prior art.

A further object is to provide a method and apparatus for manufacturing laminations that provides an interlock for relatively small diameter lamina stacks.

Another object of the present invention is to provide a lamination stack which is adapted for use in making a dynamoelectric motor and which is made according to the improved method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a top plan view of a lamina manufactured according to the present invention.

FIG. 2 is a perspective view of a lamina stack.

FIG. 3 is a top plan view of a blanked piece of strip stock.

FIG. 4 is a side elevational view of the progressive die assembly of the present invention.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 5:
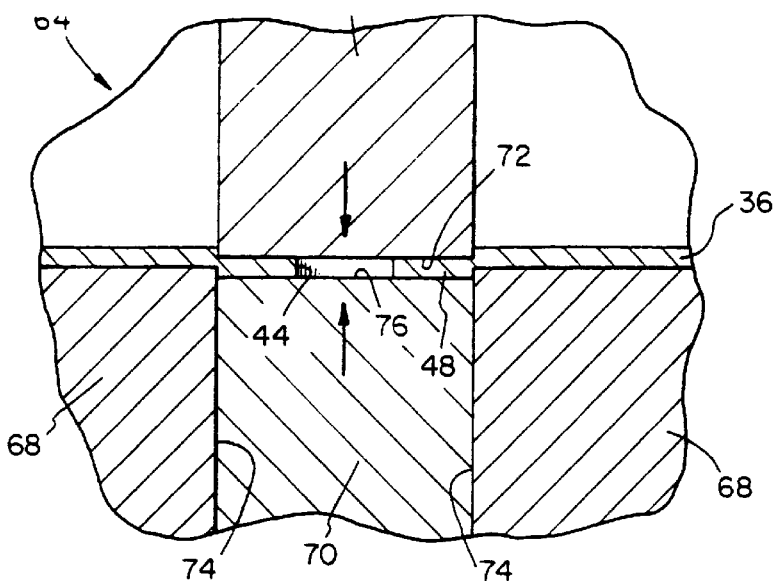
FIG. 5 is an elevational, sectional view of the punch and counterforce applying portion of the progressive die assembly.

The present invention is a centrally interlocked lamination stack and the related method and apparatus for forming laminations to be used in making electromagnetic cores. Referring to FIG. 1, a single lamination (or lamina) is shown indicated by numeral 20 which when interlocked with additional laminations forms a stack which may be used to make laminated rotor core 22 of FIG. 2. For purposes of this application, the term "stack" shall refer to one or more laminations which are adapted to be aggregated and interlocked. Each lamina 20 has a plurality of teardrop shaped slot openings or conductor slots 24 spaced about and adjacent its perimeter, in this example thirty-four. Core 22 includes central shaft hole 26 having central stack axis 28, which includes counterbore 30 formed in the lower end of core 22. Each lamina excepting the bottom lamina in core 22 has centrally located indentation 32 with a central axis coaxial with central stack axis 28, indentation 32 forming a depression in the upper lamina surface and a projection from the lamina lower surface to engage an adjacent depression in indentation 32 of the next lower lamina to interlock the adjacent laminas of core 22.

Slots 24 of laminas 20 form passageways 34 in core 22, which may be skewed in one direction in one portion and skewed in the other direction in another portion, which is the herringbone arrangement shown in FIG. 2. Alternatively, the passageways formed by slots 24 may be skewed in a single direction, or may be skewed at different angles as will become apparent from the discussion below. Passageway 34 is filled with a conductive material (not shown) in subsequent manufacturing in which core 22 is utilized to form a rotor for an electric motor or the like in a well known manner.

Referring to FIG. 3, the process of forming laminations for core 22 is illustrated by strip 36 of stock material showing the various manufacturing steps of the invention. First portion 38 illustrates the formation of bottom hole 40 for the bottom lamina of core 22, which has a diameter about the same as indentations 32. Second portion 42 shows the formation of slots 24 and center hole 44. Although second portion 42 shows a lamina which is used to form counterbore 30, center hole 44 may be omitted depending on whether the lamina is to be counter bored. Third portion 46 includes indentation portion 48 which forms the projection and depression for interlocking core 22. Fourth portion 50 shows the blanking of outer diameter 52 of the lamina, with center hole 54 being blanked if no counterbore 30 has been previously formed as shown in second and third portions 42 and 46. Fifth portion 56 shows barrel 58 having inner diameter 60 for receiving a blanked lamination, along with belt 62 for rotating barrel 58. Barrel 58 provides a mechanism for rotating the blanked lamination relative to the lamination stack, in this example by rotating barrel 58 and hence the entire stack.

In accordance with the present invention, indentation portion 48 is circular and formed by the simultaneous application of a punch and a counterforce in the axial center of the lamina as shown in FIG. 5. Die assembly 64 includes punch 66, die 68, and counterforce 70. Punch 66 has downwardly facing flat pressing surface 72 which is located directly above die aperture 74, and counterforce 70 is disposed within die aperture 74 and includes upwardly facing flat pressing surface 76. Strip 36 is positioned on die 68 so that center hole 44 is aligned in the axial center of the lamina which will be punched out from outer diameter 52. Once strip 36 is so positioned, punch surface 72 is moved into stock 36 to about half its thickness while simultaneously counterforce surface 76 applies force to indentation portion 48 in an amount which is effective to improve the flatness of indentation portion 48 so that its surface is generally planar. Also, the back pressure of counterforce 70 improves the integrity and helps to deter fracturing of the stock material.

Die assembly 64 of the present invention is included in progressive die assembly 80 shown in FIG. 4. First station 82 includes a conventional punch and die for blanking out bottom hole 40 so that the last lamina of the stack forming core 22 does not have a downward extension. However, first station 82 may be omitted if desired, with the effect of its omission being that the core formed in the remaining steps would have an indentation 32 extending at the bottom of the core. Second station 84 includes a conventional arrangement of punches for blanking out slots 24 and center hole 44. The third station comprises die assembly 64 of FIG. 5 which is for forming indentation portions 48 as described above. Fourth station 86 is conventionally referred to as a "compound" station wherein the inner and outer diameters of the lamina are blanked out of strip 36 and then located back within the plane of strip 36. The blanked lamina is then carried by the movement of strip 36 to fifth or stacking station 88 to be assembled into core 22.

Figure 6:
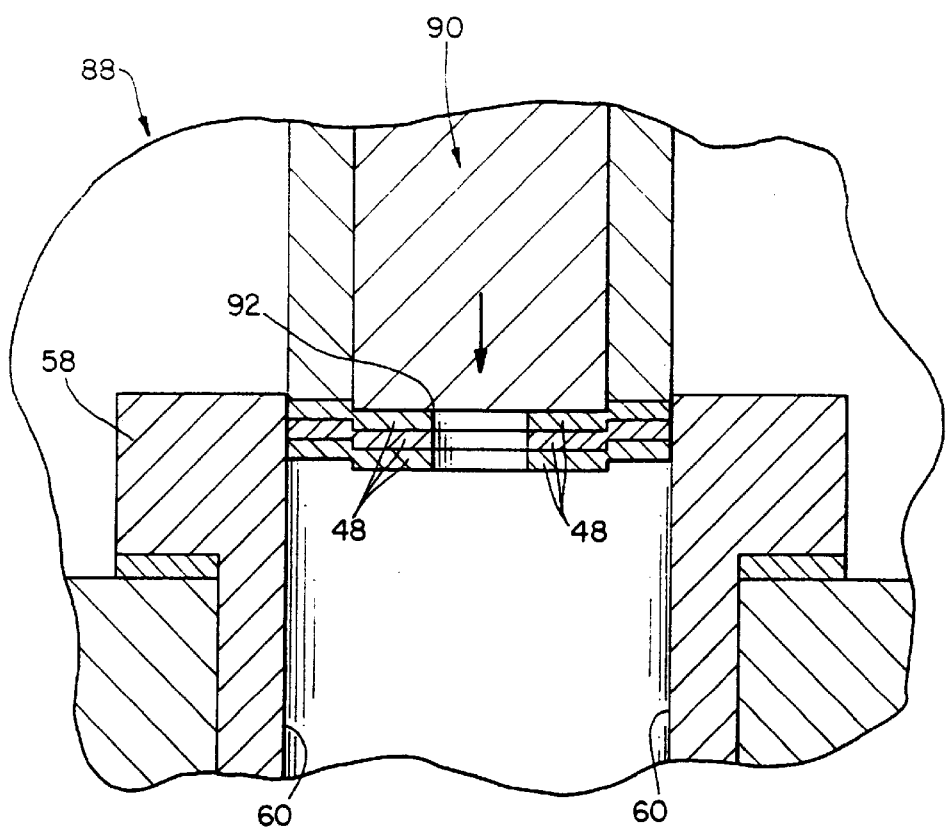
FIG. 6 is an elevational, sectional view of the interlock forming barrel of the progressive die assembly.

In accordance with the present invention, the blanked lamina is pushed into barrel 58 for stacking as shown in FIG. 6. Stacking station 88 includes barrel 58 and knockout punch 90 having an interlock portion 92 for engaging indentation portion 48 and directly applying force to securely and tightly interconnect the laminations. Preferably, the lamination stack is securely located in barrel 58 so that back pressure is present when interlock portion 92 forces indentation portion 48 into the depression in the adjacent lamination. For example, barrel 58 may include a choking ring (not shown) which holds the laminations, or alternatively carbide pieces (not shown) may be wedged between the laminations and barrel inner diameter 60.

Belt 62 (See FIG. 3) may rotate barrel 58 to skew adjacent laminas so that a skewed conductor slot passageway is formed in core 22. Also, barrel 58 may be rotated to compensate for variations in the material thickness of strip 36. The amount of rotation, and hence the time necessary to rotate barrel 58, is much smaller than with conventional methods of skewing and compensating. For straight slots, the minimum offset for thickness compensation equals the quotient of 360° divided by the number of conductor slots. For thickness compensation for skewed slots, an additional rotational component must be added to the minimum offset to provide a desired skew angle. Assuming that a base rotation of 1° is desired to form the desired skew angle and that compensation for variations in material thickness is desired in a stack of m laminas each having n slots, then barrel 58 may be rotated by the amount of the base rotation and an offset, e.g., 1°+(360/n)°. If a herringbone skew is desired, then for the first m/2 laminations barrel 58 will be turned in one direction and the for the second m/2 laminations barrel 58 will be turned in the other direction. If different angles are desired for sections of core 22, then the base rotation value may be varied. Also, depending on the variations in strip 36, the offset may be a greater angle, e.g., a multiple of 360/n. The present invention provides the advantage that barrel 58 may be rotated over a much greater range of angles to compensate for thickness variations while still providing the desired structure of core 22, although smaller angles are preferred to increase manufacturing speed.

The operation of the present invention is similar to that disclosed in the aforementioned U.S. Patents, in that a strip of stock material is moved through a progressive die assembly which performs a further processing step on each portion of the strip at each station. After formation of the conductor slots and center hole of an individual lamination, the indentation is formed in the lamination as described above, and finally the lamination is blanked from the strip and pressed into the choke barrel for stacking together with the previously manufactured and pressed together laminations. In this manner, after the first lamination is blanked from the strip, each subsequent lamination is pressed into the top lamination in the barrel. A stack of laminations is thereby formed, with the stack being rotated before pressing a new lamina into the stack to compensate for variations in material thickness. After a sufficient number of laminations are blanked and stacked, the interlocked stack may be removed for further processing. Also, the strip stock material is conventionally further processed by forming and blanking stator laminas at subsequent stations (not shown)

In the exemplary embodiment shown and described above, strip 36 is made of steel, has a width of about 126 millimeters (mm), and has a thickness of about 0.65 mm. Also, lamina 20 has an diameter of about 66 mm with indentation 32 having a diameter of about 44 mm. The punches and dies may be formed of tungsten carbide steel, or alternatively they may be made of tool steel, ceramic, or other suitable material. The counterforce may include a surface made of tool steel which is supported by a steel die spring, nitrogen ($N_2$) cylinder, or the like. The amount of force required to properly form indentation portion 48 must be sufficient to flatten the surfaces of indentation 48, which may vary according to the stock material, the diameter of the indentation, and the material thickness; and the required flattening force is preferably at least about ten percent of the blanking pressure of the material. In the exemplary embodiment, the counterforce applied when forming indentation portion 48 is in the range of about 10% to 20% of the blanking pressure of the material. However, this value is dependent on the actual materials used and the surface area to which the counterforce is to be applied.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for manufacturing an interlocked stack of laminations from a sheet of stock material, the stack of interlocking laminations defining a plurality of circumferentially spaced slots which are disposed at a desired skew angle relative to the stack axis of the interlocked lamination stack, the interlocked stack adapted for manufacturing a rotor for a dynamoelectric machine, said apparatus comprising:

a blanking station for blanking laminations from the stock material;

a die assembly located at said blanking station, said die assembly including a first punch for forming a generally circular indentation in each said lamination, each said indentation having a central axis coaxial with said stack axis, each said indentation defining a corresponding depression and projection; and a stacking station for receiving said laminations from said blanking station and associating each said lamination with a lamination stack, said stacking station including a rotator automatically rotating said lamination stack relative to each said lamination by an angle sufficient to create a slot in the resulting lamination stack having the desired skew angle, said stacking station also including a second punch interlocking said indentations so that said projections extend into adjacent said depressions to form the desired stack of interlocked laminations.

2. The apparatus of claim 1 wherein said die assembly includes a counterpunch simultaneously applying a counterforce to each said lamination at the surface of said lamination opposite to said first punch, said counterpunch being adapted to apply force in the amount of from ten percent to twenty percent of the blanking pressure of the stock material.

3. The apparatus of claim 1 wherein said die assembly moves said first punch below the surface of the stock material to a distance of about half the thickness of the stock material.

4. The apparatus of claim 1 wherein said second punch individually presses each said indentation to thereby force the corresponding said projection into said depression of an adjacent said lamination.

5. The apparatus of claim 1, wherein said rotator rotates said lamination stack relative to each said lamination by about $360/n°$ to compensate for thickness variations in the stock material, whereby each said lamination includes a plurality of n said slots.

6. The apparatus of claim 1, wherein said rotator rotates said lamination stack relative to each said lamination by a multiple of about $360/n°$ to compensate for thickness variations in the stock material, whereby each said lamination includes a plurality of n said slots.

7. The apparatus of claim 1 further comprising a choke, said choke holding said lamination stack at said stacking station, said rotator rotating said choke in one direction for a first portion of said laminations and rotating said choke in the other direction for a second portion of said laminations to thereby form herringbone shaped slots.

8. The method of claim 1 wherein said choke includes a rotatable barrel adapted to securely hold said lamination stack.

* * * * *